Nov. 11, 1969     L. R. FLIGER, JR     3,477,680
DEVICE FOR PREVENTING A CAKE FROM SLIPPING ON A PLATE
Filed July 21, 1967

INVENTOR
LOUIS R. FLIGER, JR.
BY
Robert Henderson
ATTORNEY

United States Patent Office 3,477,680
Patented Nov. 11, 1969

3,477,680
DEVICE FOR PREVENTING A CAKE FROM SLIPPING ON A PLATE
Louis R. Fliger, Jr., New Hampton, Iowa; Josephine Fliger and Marnell Fox, administrators of said Louis R. Fliger, Jr., deceased
Filed July 21, 1967, Ser. No. 655,010
Int. Cl. A47g 29/00
U.S. Cl. 248—346                                  2 Claims

ABSTRACT OF THE DISCLOSURE

This invention relates generally to a cake device for securing a cake to a plate, which device is small so as to be held in the hand, of plastic or the like with an upstanding projection on a base, the latter to be adhered to a plate or the like whereby the upstanding projection projects into the cake, thereby preventing sliding movement of same.

Background of the invention

The field of this art includes a number of cake plates incorporating various securing devices, but the field has been void of any securing device independent of a plate, and adaptable to any plate preferred by the user.

It has long been known that a cake, and particularly a decorated cake, is prone to slip from its plate when the cake is tilted or in transit. Should the cake come in contact with another object, such as cake box, the decoration is subject to mutilation. This invention will secure the cake to the plate and thus prevent the cake from slipping while not materially affecting the cake itself.

Summary of the invention

The purpose of this invention is to provide a device which is a cone-like projection extended upwardly from a base, with adhesive means attached to the flat underside of the base so that the device can be removably secured by itself or with other identical devices, to the surface of a cake plate or the like for retaining a cake thereon against slippage during transportation of the cake.

It is an object of this invention to provide a device capable of preventing a cake from slipping on a plate or the like.

It is yet another object of this invention to provide a cake device which may be effectively used with any size cake.

It is still another object of this invention to provide a cake slipping prevention device as hereinbefore defined wherein said device may be effectively used without materially affecting the cake or its appearance.

Yet another object of this invention is to provide a device capable of attaining the above designated objectively which is simple, economical, and effective.

These objects, and other features and advantages of this invention will become readily apparent upon reference to the following description when taken in conjunction with the accompanying drawings.

Description of the preferred embodiment

Figure 1:
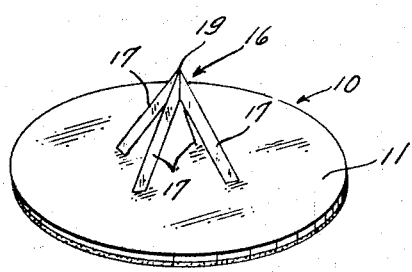
FIG. 1 is a perspective view to actual scale of the present invention.

Referring now to the drawings, the cake securing device of this invention is indicated generally at 10. The device 10 comprises a base 11, here illustrated as a thin flat disc. Secured to the lower side 12 (FIG. 3) of the base 11 is a thin layer of any suitable adhesive material 13. Attached to the upper side 14 of the base 11 is a pointed projection 16 comprised of a plurality of slanted fin-shaped uprights 17. Each upright 17 is of the same length and each projects from the base 11 at intervals equidistant from the center 18 of the base 11. The uprights are slanted toward the center 18 and interconnect to form a point 19.

Figure 2:
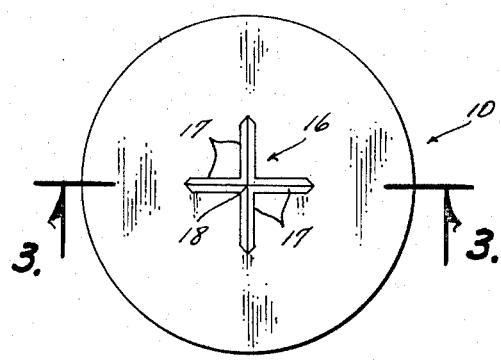
FIG. 2 is a plan view of FIG. 1.

The base 11 of the device 10 is comprised of any suitable stiff material. However, the material need not be rigid. Though the base 11 is illustrated (FIGS. 1 and 2) as circular, it is anticipated that any shape or design may be employed. Though the lower surface 12 of the base should be flat, the upper surface 14 may be flat, round, ridged or decorative.

Figure 3:
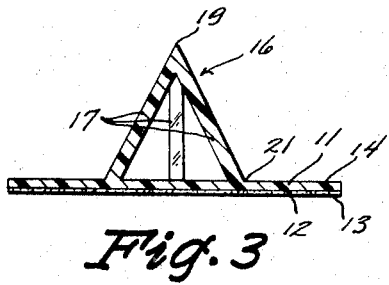
FIG. 3 is a sectional view as taken along the lines 3—3 in FIG. 2.

The projection 16 as best viewed in FIG. 3 is comprised of a plurality of stiff, fin-shaped projections 17 of a plastic or similar material. In practice it has been found that the device 10 may be more simply made by casting the mold for the projection 16 and base 11 simultaneously with the same plastic material. Thus by integrating the two means 16 and 11, it obviates the need of attaching the projection 16 to the base 11 at the junction 21.

Though the projection 16 is illustrated as being composed of four uprights 17, any number may be used. By using a single upright, centered in relation to the base, the size of the cake penetration may be reduced.

Affixed to the lower flat surface 12 of the base 11 is an adhesive substance 13 capable of adhering upon contact to a paper, wood, glass, or plastic cake dish or plate.

Figure 4:
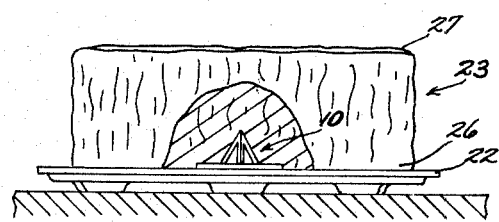
FIG. 4 is an elevational view of a single layer cake upon a plate, showing the invention adhered to the plate and the upright fins penetrating the cake.
Figure 5:
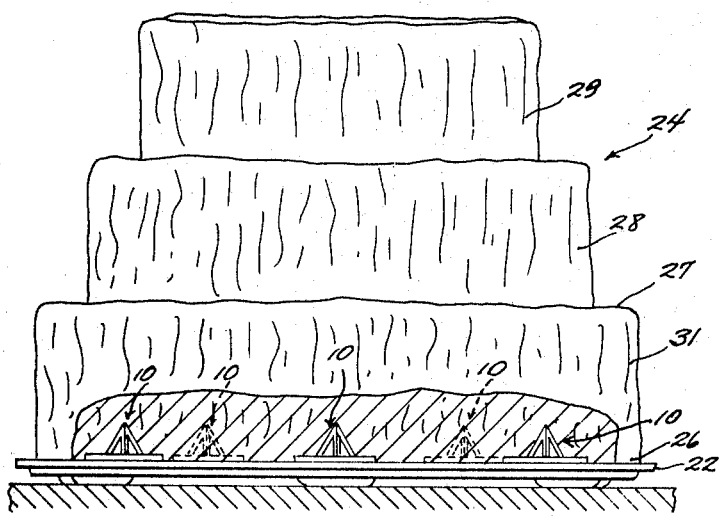
FIG. 5 is an elevational view of a larger multilayer cake upon a plate, showing five distributed devices of this invention adhered to the plate and penetrating the bottom layer of the cake.

The device 10 is attached to the plate 22 (FIGS. 4 and 5) of the baker or user's preference by stripping a protective shield (not shown) from the contact adhesive surface and placing the device 10 on the desired space and exerting slight pressure toward the lower surface 12 of the device 10. The number of devices 10 to be used per cake 23, 24 is determined by the size of the cake 23, 24. Generally, one device 10 is sufficient to secure the average one layer cake 23 to the preferred plate 22 (FIG. 4). In this instance, the device 10 is placed in the center of the plate 22. If a larger cake (FIG. 5) is to be secured to the plate 22, a plurality of devices 10 may be necessary or preferred. This may be so, even though the larger cake 24 may not be multilayered, but larger in base area. When a plurality of devices 10 are employed, the devices 10 are displaced at appropriate intervals.

After the devices 10 are secured to the plate 22, the cake 23, 24 is lifted from the baking pan and placed upon the points 19 of the devices 10 in such a manner that the cake 23, 24 is centered in relation to the plate 22. Normally, the weight of the cake 23, 24 will be sufficient to allow the pointed projection 16 to penetrate the bottom 26 of the cake 23, 24. However, slight downward pressure upon the top 27 of the cake 23 or top 27 of the bottom layer 31 of the cake 24 will complete the penetration without injury to the cake 23, 24. After the bottom layer 31 of the cake 24 is secured to the plate 22, additional layers 28, 29 may be placed upon the bottom layer 31 in the usual manner or custom.

When the cake 23, 24 is thus secured to the plate 22, the baker will then proceed to frost or decorate it, assured that it will remain upon the plate in the desired position when being moved or boxed. As the cake is being served should a slice be sitting upon a device 10, the slice is easily lifted off by a straight upward motion without harming the slice or its appearance. When the slice is lifted, the device 10 may be removed from the plate 22 with a slight upward pull and discarded.

Although a preferred embodiment of the invention has been described and disclosed hereinbefore, it is to be remembered that various other alternative constructions and modifications thereof can be made thereto without departing from the true spirit and scope of the invention as defined in the appended claims.

I claim:
1. A cake device for securing a cake to a plate, the device comprising:
   base means;
   centrally positioned projection means formed on the upper side of said base means, said projection means comprising a plurality of uprights attached to said base means, said uprights slanted toward the center of said base means, said uprights interconnected at their upper extremities so as to form a point thereby; and
   adhesive means attached to the underside of said base means.
2. A cake device for securing a cake to a plate as described in claim 1, and wherein said uprights are of equal length.

References Cited

UNITED STATES PATENTS

| | | | |
|---|---|---|---|
| 920,236 | 5/1909 | Albee | 248—467 |
| 1,496,282 | 6/1924 | Taylor | 248—467 |
| 1,961,342 | 6/1934 | De Reamer | 248—346 |
| 2,061,372 | 11/1936 | Wallin | 248—467 |
| 2,627,111 | 2/1953 | McDevitt. | |
| 2,777,308 | 1/1957 | Roberts et al. | 248—346 |
| 2,829,459 | 4/1958 | Halpern | 248—346 XR |
| 2,934,213 | 4/1960 | Stockwell | 211—57 |
| 3,239,178 | 3/1966 | Pompa. | |

CHANCELLOR E. HARRIS, Primary Examiner

JOHN PETO, Assistant Examiner

U.S. Cl. X.R.

248—205, 467